United States Patent

[11] 3,582,220

| | | |
|---|---|---|
| [72] | Inventor | Tsukumo Nobusawa<br>Asaka-shi, Japan |
| [21] | Appl. No. | 800,191 |
| [22] | Filed | Feb. 18, 1969 |
| [45] | Patented | June 1, 1971 |
| [73] | Assignee | Asahi Kogaku Kogyo Kabushiki Kaisha<br>Tokyo-to, Japan |
| [32] | Priority | Feb. 21, 1968, Feb. 21, 1968 |
| [33] | | Japan |
| [31] | | 43/10503 and 43/10504 |

[54] LIGHT CONTRAST METER FOR MEASURING THE DIFFERENCE BETWEEN MAXIMUM LIGHT INTENSITY AND IMMEDIATELY INCIDENT LIGHT INTENSITY OR OTHER INTENSITY
10 Claims, 1 Drawing Fig.

[52] U.S. Cl.................................................. 356/226,
250/206, 250/214, 250/219, 307/311, 356/229, 356/230
[51] Int. Cl...................................................... G01j 1/10, G01j 1/12, G01j 1/44
[50] Field of Search............................................ 250/206, 214, 219 F; 307/311; 318/229; 356/230, 226

[56] References Cited
UNITED STATES PATENTS

| | | | |
|---|---|---|---|
| 3,343,043 | 9/1967 | Ito et al.......................... | 250/206 |
| 3,347,141 | 10/1967 | Nobusawa et al............. | 200/206 |
| 3,476,944 | 11/1969 | Odone........................... | 250/206 |

*Primary Examiner*—James W. Lawrence
*Assistant Examiner*—T. N. Grigsby
*Attorney*—Stanley Wolder ABSTRACT: A light contrast meter successively exposable to different light intensities provides a visual indication of the light intensity extremes or the difference between the light intensity extreme and the immediate incident light. In one form a capacitor is charged through a diode to a voltage corresponding to maximum incident light and is connected in series with an impedance the voltage across which varies with the incident light and a meter measures the difference of this voltage and that across the capacitor. In another form a pair of photoconductors are connected in series with respective resistors one capacitor being connected through a diode across the first resistor and another capacitor being connected through a diode across the second photoconductor and meters measure the capacitor voltages.

PATENTED JUN 1 1971

3,582,220

INVENTOR
TSUKUMO NOBUSAWA
BY Stanley Wolder
ATTORNEY

LIGHT CONTRAST METER FOR MEASURING THE DIFFERENCE BETWEEN MAXIMUM LIGHT INTENSITY AND IMMEDIATELY INCIDENT LIGHT INTENSITY OR OTHER INTENSITY

BACKGROUND OF THE INVENTION

The present invention relates generally to improvements in light measuring devices and it relates particularly to an improved network for measuring a relationship of the light intensities of a predetermined scanned area.

In photographing an illuminated area of different light intensities the distribution and relationship of these different light intensities are important parameters in determining the exposure conditions of the film employed in a photographic camera or the exposure conditions of a television camera for the recording or transmission of an image of a photographed area. These measurements are particularly important where the film employed possesses a very narrow tolerance or range for high fidelity reproduction such as in the case of color film and in many forms of color image recording and transmission. A common procedure employed in determining the exposure parameters is to measure the average intensity of an area being photographed or viewed by exposing a photometer to the complete area. This procedure is often highly unsatisfactory since the highly illuminated areas are overexposed and the low illuminated or shadow areas are underexposed. Thus, in photographing a black illuminated subject, the subject is dark and underexposed. Many other viewed and photographed areas are poorly handled when the average intensity is employed as a control, such as spotlight illuminated stage areas, and other types of lighted stage areas which vary with time and position. Spot photometers having narrow viewing angles have been employed but these are extremely difficult to correctly use and handle and convert to the correct control parameters even by those highly skilled and experienced. It is thus apparent that the conventional devices employed in the light intensity measurement of areas to be photographed or televised possess numerous drawbacks and disadvantages and leave much to be desired.

SUMMARY OF THE INVENTION

It is a principal object of the present invention to provide an improved light measuring device.

Another object of the present invention is to provide an improved device for measuring a relationship of the light intensities of a predetermined area.

Still another object of the present invention is to provide an improved device for measuring the light intensity contrasts of a scanned area.

A further object of the present invention is to provide an improved device for measuring the ratio between the maximum or minimum light intensities of a scanned area to the light intensity of selected points thereof or for effecting the concurrent measurements of the maximum and minimum light intensities of a scanned area.

A further object of the present invention is to provide an improved device for measuring the ratio between the maximum or minimum light intensities of a scanned area and the light intensity of selected points thereof or for effecting the concurrent measurements of the maximum and minimum light intensities of a scanned area.

Still a further object of the present invention is to provide a device of the above nature characterized by its accuracy, simplicity, reliability, versatility and adaptability.

The above and other objects of the present invention will become apparent from a reading of the following description taken in conjunction with the accompanying drawing which illustrates preferred embodiments thereof.

In a sense the present invention contemplates the provision of a light measuring device comprising light sensitive means successively exposable to light of different intensities, a capacitor, means responsive to said light sensitive means for charging said capacitor to a voltage corresponding to one extreme of said light intensities, and means for providing an indication of the relationship of the light intensity corresponding to said voltage and a light of different intensity incident on said light sensitive means. According to one form of the improved device there are provided a photocell successively exposable to light of different intensities, a capacitor, first means responsive to the light intensity incident on said photocell for charging said capacitor to a corresponding predetermined voltage, and second means responsive to a function of the light incident on said photocell and said predetermined voltage. According to another form, the device includes light sensitive means exposable to a common incident light of different intensities, first and second capacitors, means responsive to said light sensitive means for charging said first and second capacities to voltages corresponding respectively to said incident light of maximum and minimum intensities, and means for providing visual indications of the voltages across said capacitors.

The photocell is advantageously a photoconductor which is connected in series with an impedance, advantageously a nonlinear resistor such as a log diode, across a voltage source. The capacitor is connected through a diode across the impedance or photoconductor to permit the charging and inhibit the discharging of the capacitor. The capacitor is connected to the high impedance input of an amplifier, such as a field effect transistor, Darlington connected transistor or the like, the output of the amplifier being connected to a meter.

In the first form of the improved light measuring device, after the capacitor is discharged by a shorting switch, the illuminated area is scanned by the photocell to charge the capacitor to a voltage corresponding to maximum or minimum illumination depending on the circuit arrangement. Thereafter, the meter will provide a reading indicative of the ratio between the photocell incident light intensity and said maximum or minimum intensity. Employing the light measuring device of the second form the area is scanned once and the respective meters provide readings of the maximum and minimum light intensities of the scanned area. The obtained information is of great use in the adjustment and control of exposure parameters and is simply and rapidly obtained in a highly convenient and optimum form.

DESCRIPTION OF PREFERRED EMBODIMENTS

Figure 1:
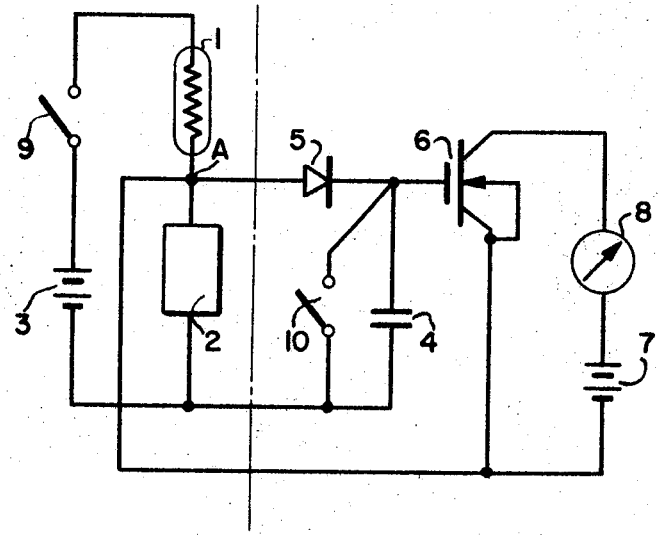
FIG. 1 is a circuit diagram of a preferred embodiment of the present invention.

Referring now to the drawing, and particularly FIG. 1 thereof which illustrates a preferred embodiment of the present invention, the reference numeral 1 generally designates a photoconductor type of photocell which has any suitable aperture or lens arrangement associated therewith to expose the photoconductor 1 to a narrow field angle. The photoconductor 1 is connected through a switch 9 to the positive terminal of a battery 3, and through an impedance 2, with which it defines a voltage divider, to the negative terminal of battery 3. The impedance 2 is advantageously a resistance device such as a known equal spacing circuit section, for example, a log diode.

A low leakage storage capacitor 4 has one terminal connected to the negative terminal of battery 3 and its other terminal connected to the cathode of a diode 5 the anode of which is connected to the junction A of photoconductor 1 and impedance 2. A switch 10 is connected across the capacitor 4 and may be ganged with switch 9 so that when one switch is open the other is closed. The cathode of diode 5 is connected to the gate of a field effect transistor 6, the source of which is connected to junction point A. A current meter 8 is connected in series with a battery 7 between the source and collector of field effect transistor 6. It should be noted that any suitable high impedance input amplifier may be substituted for the field effect transistor 6, such as a Darlington connected transistor.

In employing the light measuring device described above, switch 9 is closed and switch 10 is opened, the closed switch 10 having previously discharged capacitor 4. The desired area is then completely scanned to expose the photoconductor 1 to successive sections thereof. The resistance of photoconductor 1 varies inversely with intensity of the light incident thereon so that the positive potential of point A increases with increases in the incident light intensity. With each increase in the potential of point A the capacitor 4 is further charged through the diode 5 to the increased voltage across impedance 2. However, any drop in the potential of point A by reason of a drop in the intensity of the incident light does not effect any discharge of capacitor 4 because of the blocking action of diode 5. Accordingly, the capacitor 4 is charged to a voltage corresponding to the maximum light intensity incident on photoconductor 1.

The signal applied between the gate and source of transistor 6 is the difference between the voltages across capacitor 4 and impedance 2 which are series connected in bucking relationship across the transistor input. Thus the meter 8 provides a reading corresponding to the differences of these voltages and hence a reading of the ratio of the intensity of the photoconductor incident light to the maximum light intensity which may be indicated as an exposure multiple of the incident light intensity to the maximum light intensity by reason of the log diode network 2 the voltage across which varies as an arithmetical progression function of the incident light intensity. When the photoconductor 1 is exposed to the maximum intensity light the transistor input signal is zero and the meter 8 provides a corresponding indication. The area is scanned and the maximum reading of meter 8 is an indication of the ratio of the minimum to maximum light intensities.

It should be noted that the positions of photoconductor 1 and impedance 2 may be mutually reversed in their positions in the illustrated network in which case the capacitor 4 will be charged to a voltage corresponding to minimum light intensity and the meter 8 will provide a reading corresponding to the ratio of the incident light intensity to the minimum light intensity. The highest meter reading will correspond to the ratio of maximum to minimum light intensity. By reason of the high reverse impedance of diode 5 and the high input impedance of transistor 6 the capacitor maintains its charge for a long time. To scan another area, the capacitor is initially discharged by closing switch 10 and opening it prior to the scanning operation.

Figure 2:
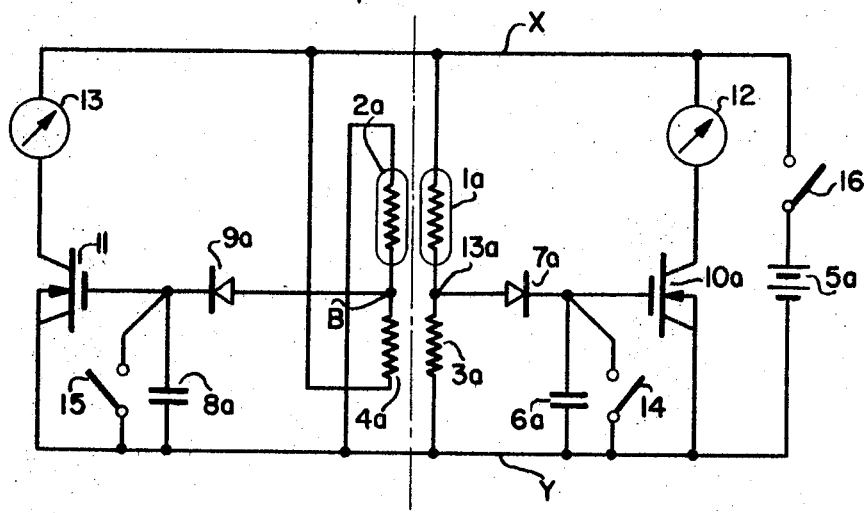
FIG. 2 is a circuit diagram of another embodiment thereof.

In FIG. 2 of the drawing there is illustrated another embodiment of the present invention differing from that first described generally in that a pair of meters are provided which respectively afford readings of the maximum and minimum light intensity values of a scanned area. The improved device includes a pair of proximate similar photoconductors 1a and 2a which are exposed to a common small angle field of view. The positive terminal of a battery 5a is connected through a switch 16 to a positive line x and the negative terminal thereof is connected to a negative line y. One terminal of photoconductor 1a is connected to line x and the other terminal is connected through a resistor 3a to line y and one terminal of photoconductor 2a is connected to line y and the other terminal thereof is connected through a resistor 4a to line x.

One terminal of a capacitor 6a is connected to the gate of a field effect transistor 10a and to the cathode of a diode 7a the anode of which is connected to the junction 13a of photoconductor 1a and resistor 3a, and the other terminal of capacitor 6a is connected to line y. One terminal of a capacitor 8a is connected to the gate of a field effect transistor 11 and to the cathode of a diode 9a the anode of which is connected to the junction B of photoconductor 2a and resistor 4a, and the other terminal of capacitor 8a is connected line y. Capacitor 6a is shunted by a switch 14 and capacitor 8a is shunted by a switch 15 which may be engaged with switch 14 to be concurrently closed and opened therewith. The collector of transistor 10a is connected through a current meter 12 to line x and the source of transistor 10a is connected to line y. The collector of transistor 11 is connected through a current meter 13 to line x and the source of transistor 11 is connected to line y.

Considering now the operation of the device last described, the previously closed switches 14 and 15 are opened and switch 16 is closed and a desired illuminated area is scanned to expose the photoconductors 1a and 2a to successive common sections thereof. An increase in the incident light intensity during scanning will lower the resistances of photoconductors 1a and 2a to raise the positive potential of point 13a and lower the positive potential of point B. As a consequence the charge on capacitor 6a will increase through diode 7a to the voltage across voltage divider leg resistor 3a but the charge on capacitor 8a will be unaffected by reason of the blocking action of diode 9a. On the other hand a drop in the incident light intensity will increase the photoconductor resistances and lower the positive potential of point 13a and raise that of point B. Consequently the charge on capacitor 8a will increase to the voltage across photoconductor 2a and the charge on capacitor 6a will be unaffected. Accordingly capacitor 8a will reach and maintain a charge voltage in accordance with the minimum incident light intensity from the scanned area and inversely proportional thereto and capacitor 3a will reach and maintain a charge voltage in accordance with the maximum incident light intensity from the scanned area and directly proportional thereto. Thus the desired area is scanned once and the final readings on meters 12 and 13 which are controlled by the voltages on capacitors 6a and 8a indicate the maximum and minimum incident light intensities respectively. Another area may be scanned merely by closing and opening the switches 14 and 15 to discharge capacitors 6a and 8a.

It should be noted that the network illustrated in FIG. 2 may be modified so that only one photoconductor is required by connecting the capacitors 6a and 8a through corresponding diodes 7a and 9a to different terminals of a bridge network including the photoconductor and connected to a voltage source whereby the voltage at said different terminals vary in opposite directions with changes in the resistance of the photoconductor.

While there have been described and illustrated preferred embodiments of the present invention, it is apparent that numerous alterations, omissions and additions may be made without departing from the spirit thereof.

What I claim is:

1. A light measuring device comprising a photocell successively exposable to light of different intensities, a capacitor, first means responsive to the light intensity incident on said photocell for charging said capacitor to a predetermined voltage corresponding to an extreme intensity of the light incident on said photocell and second means responsive to a function of the light incident on said photocell and said predetermined voltage.

2. The light measuring device of claim 1 wherein said photocell comprises a photoconductor and said charging means comprises a voltage source, a voltage divider including said photoconductor and an impedance as legs thereof, means connecting said voltage divider across said voltage source, and means including a diode connecting said capacitor across one of said voltage divider legs for charging said capacitor to the maximum voltage across said one of said divider legs.

3. The light measuring device of claim 2 wherein said second means comprises an amplifier including an output and a high impedance input and means for connecting said capacitor in series with one of said voltage divider legs to said amplifier input, and a meter connected to said amplifier output.

4. The light measuring device of claim 2 including a switch connected across said capacitor and movable between open and closed positions.

5. The light measuring device of claim 2 wherein said impedance comprises a logarithmically responsive diode.

6. The light measuring device of claim 2 wherein said capacitor is connected in series with said diode across said impedance, and said second means comprises an amplifier having an output and a high impedance input and a meter connected to said output, said capacitor and said impedance being connected in series across said amplifier input.

7. A light measuring device comprising light sensitive means successively exposable to light varying between maximum and minimum intensities, first and second capacitors, means responsive to said light sensitive means for charging said first and second capacitors to voltages corresponding respectively to said incident light of maximum and minimum intensities, and means for providing visual indications of the voltages across said capacitors.

8. The light measuring device of claim 7 wherein said light sensitive means comprises first and second photoconductors, said capacitor charging means comprises a voltage source, a first impedance connected in series with said first photoconductor across said voltage source and means including a first diode connecting said first capacitor across said first photoconductor, a second impedance connected in series with said second photoconductor across said voltage source, and means including a second diode connecting said second capacitor across said second impedance.

9. The light measuring device of claim 8 wherein said visual indicating means includes a pair of amplifiers having outputs and high impedance inputs connected to respective of said capacitors, and a meter connected to the output of each of said amplifiers.

10. A light measuring device comprising light sensitive means successively exposable to light of different intensities, a capacitor, means including a diode connected in series with said capacitor responsive to said light sensitive means for charging said capacitor to a voltage corresponding to one extreme of said light intensities, and means for providing an indication of the relationship of the light intensity corresponding to said voltage and a light of different intensity incident on said light sensitive means.